(12) United States Patent
Adams et al.

(10) Patent No.: US 11,760,248 B2
(45) Date of Patent: Sep. 19, 2023

(54) RECREATIONAL VEHICLE WITH RECONFIGURABLE TABLE

(71) Applicant: REV Recreation Group, Inc., Decatur, IN (US)

(72) Inventors: Kasey Lee Adams, Decatur, IN (US); Mark Anthony Perez, Fort Wayne, IN (US)

(73) Assignee: REV Recreation Group, Inc., Decatur, IN (US)

( * ) Notice: Subject to any disclaimer, the term of this patent is extended or adjusted under 35 U.S.C. 154(b) by 0 days.

(21) Appl. No.: 17/544,169

(22) Filed: Dec. 7, 2021

(65) Prior Publication Data

US 2022/0176859 A1    Jun. 9, 2022

Related U.S. Application Data

(60) Provisional application No. 63/122,266, filed on Dec. 7, 2020.

(51) Int. Cl.
*B60N 3/00* (2006.01)
*B60P 3/36* (2006.01)
*B60P 3/34* (2006.01)

(52) U.S. Cl.
CPC .............. *B60N 3/001* (2013.01); *B60P 3/36* (2013.01); *B60P 3/34* (2013.01)

(58) Field of Classification Search
CPC . B60N 3/001; A47B 5/006; B60P 3/34; B60P 3/36
USPC ........................................ 296/24.33; 108/44
See application file for complete search history.

(56) References Cited

U.S. PATENT DOCUMENTS

| | | | |
|---|---|---|---|
| 4,709,641 A † | 12/1987 | Lenger | |
| 6,925,944 B1 † | 8/2005 | Miller | |
| 7,399,031 B2 | 7/2008 | Gardner | |
| 8,887,644 B2 * | 11/2014 | Edinger | A47B 11/00 108/42 |
| 8,894,121 B2 * | 11/2014 | Eilers | B60N 3/001 224/564 |

(Continued)

FOREIGN PATENT DOCUMENTS

KR    20230019346 A  *  2/2023  ............. B60N 3/001

*Primary Examiner* — Jason S Morrow
*Assistant Examiner* — Wenwei Zhou
(74) *Attorney, Agent, or Firm* — Michael Best & Friedrich LLP

(57) ABSTRACT

A recreational vehicle is disclosed comprising wheels adapted to roll along a ground surface, a chassis supported on the wheels, and a table assembly supported by the chassis and having a supporting surface adapted to support an object. The table assembly includes a stowed position in which the supporting surface defines a first plane and an extended position in which the supporting surface defines a second plane generally parallel to the first plane. The extended position is rotationally displaced from the stowed position. A center of gravity of the table member may be spaced from the wall by a first horizontal distance when in the stowed position and may be spaced from the wall by a second horizontal distance greater than the first horizontal distance when in the extended position. If desired, an upper stay member can be positioned above the table member to limit upward movement of the table member.

21 Claims, 7 Drawing Sheets

(56) References Cited

U.S. PATENT DOCUMENTS

| | | | |
|---|---|---|---|
| 9,371,029 B2* | 6/2016 | Hillman | B60N 3/001 |
| 9,878,648 B2 | 1/2018 | Hillman et al. | |
| 11,518,286 B2* | 12/2022 | Hwang | B60N 2/12 |
| 2007/0102975 A1* | 5/2007 | Gardner | B60P 3/36 |
| | | | 5/2.1 |
| 2009/0249982 A1* | 10/2009 | Palethorpe | A47B 5/00 |
| | | | 108/44 |
| 2017/0080954 A1* | 3/2017 | Pailler | A47B 5/02 |
| 2022/0095785 A1* | 3/2022 | Satterfield | B64D 11/0638 |
| 2022/0117389 A1* | 4/2022 | O'Hara | A47B 5/006 |

\* cited by examiner
† cited by third party

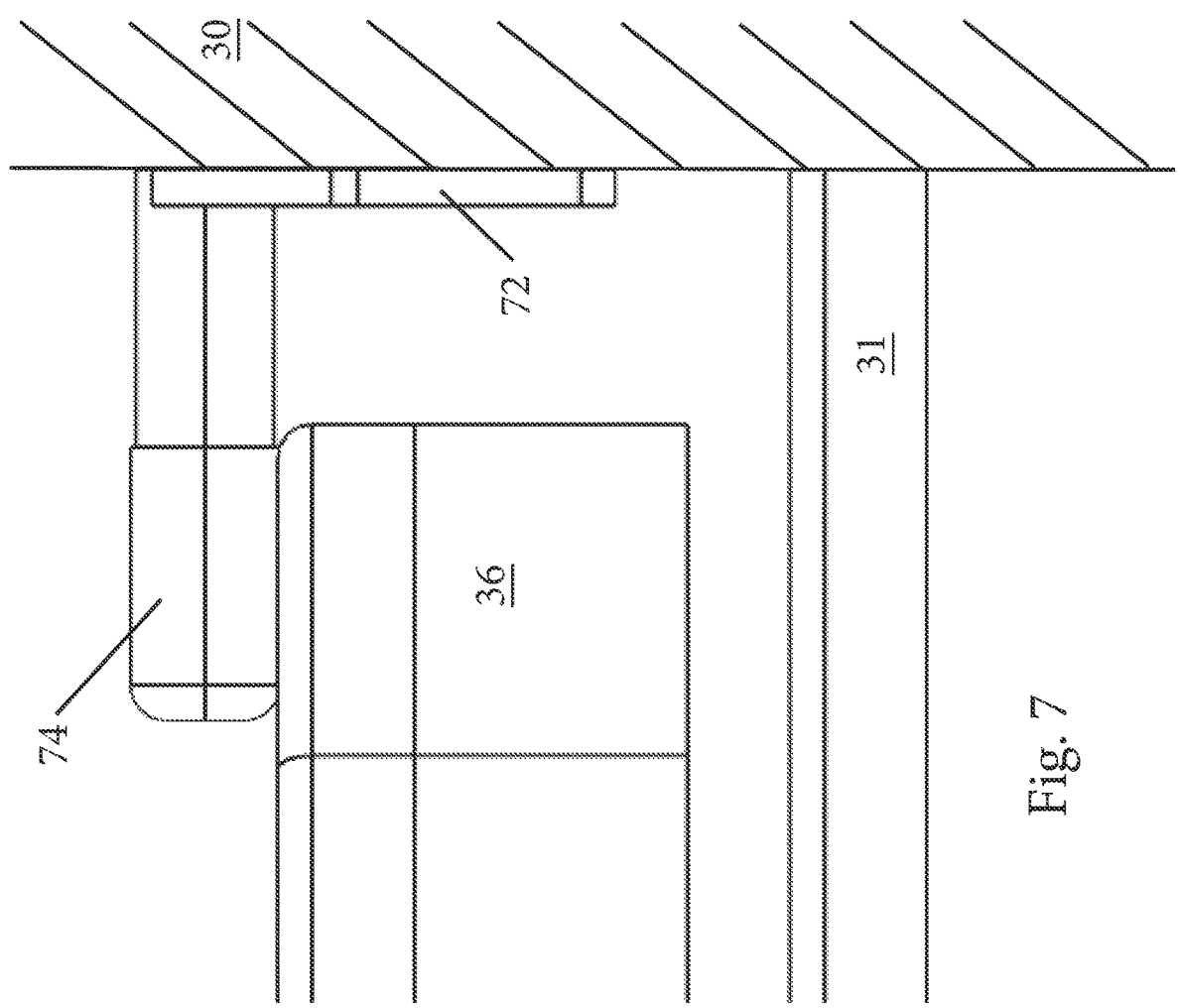

US 11,760,248 B2

RECREATIONAL VEHICLE WITH RECONFIGURABLE TABLE

BACKGROUND

The present disclosure relates generally to the field of recreational vehicles and specifically to a table that can be reconfigured to multiple different orientations.

SUMMARY

Described herein is a recreational vehicle comprising wheels adapted to roll along a ground surface, a chassis supported on the wheels, and a table assembly supported by the chassis and having a supporting surface adapted to support an object. The table assembly includes a stowed position in which the supporting surface defines a first plane (e.g., a generally horizontal plane) and an extended position in which the supporting surface defines a second plane (e.g., a generally horizontal plane) generally parallel to (e.g., co-planar with) the first plane. The extended position is rotationally displaced from the stowed position.

In one embodiment, the recreational vehicle further comprises a wall supporting the table assembly, and the table assembly includes a table member having a first edge positioned adjacent the wall when in the stowed position. Preferably, a second edge (e.g., different than the first edge) of the table member is positioned adjacent the wall when in the extended position. A center of gravity of the table member may be spaced from the wall by a first horizontal distance when in the stowed position and may be spaced from the wall by a second horizontal distance greater than the first horizontal distance when in the extended position.

If desired, an upper stay member can be positioned above the table member to limit upward movement of the table member. The stay member may include an anti-scratch material (e.g., plastic) or a roller member positioned to provide rolling motion between the table member and the stay member.

The table assembly can further include a transfer mechanism coupled to the table member to facilitate movement of the table member between the stowed position and the extended position. The transfer mechanism preferably includes a telescoping slide mechanism and a rotation mechanism. For example, the rotation mechanism can be supported by the telescoping slide mechanism.

Other aspects of the disclosure will become apparent by consideration of the detailed description and accompanying drawings.

BRIEF DESCRIPTION OF THE DRAWINGS

FIG. 7 is a side view of the upper support positioned above the table member in the extended position.

DETAILED DESCRIPTION

Before any embodiments are explained in detail, it is to be understood that the present disclosure is not limited in its application to the details of construction and the arrangement of components set forth in the following description or illustrated in the following drawings. The disclosure is capable of other embodiments and of being practiced or of being carried out in various ways.

Figure 1:
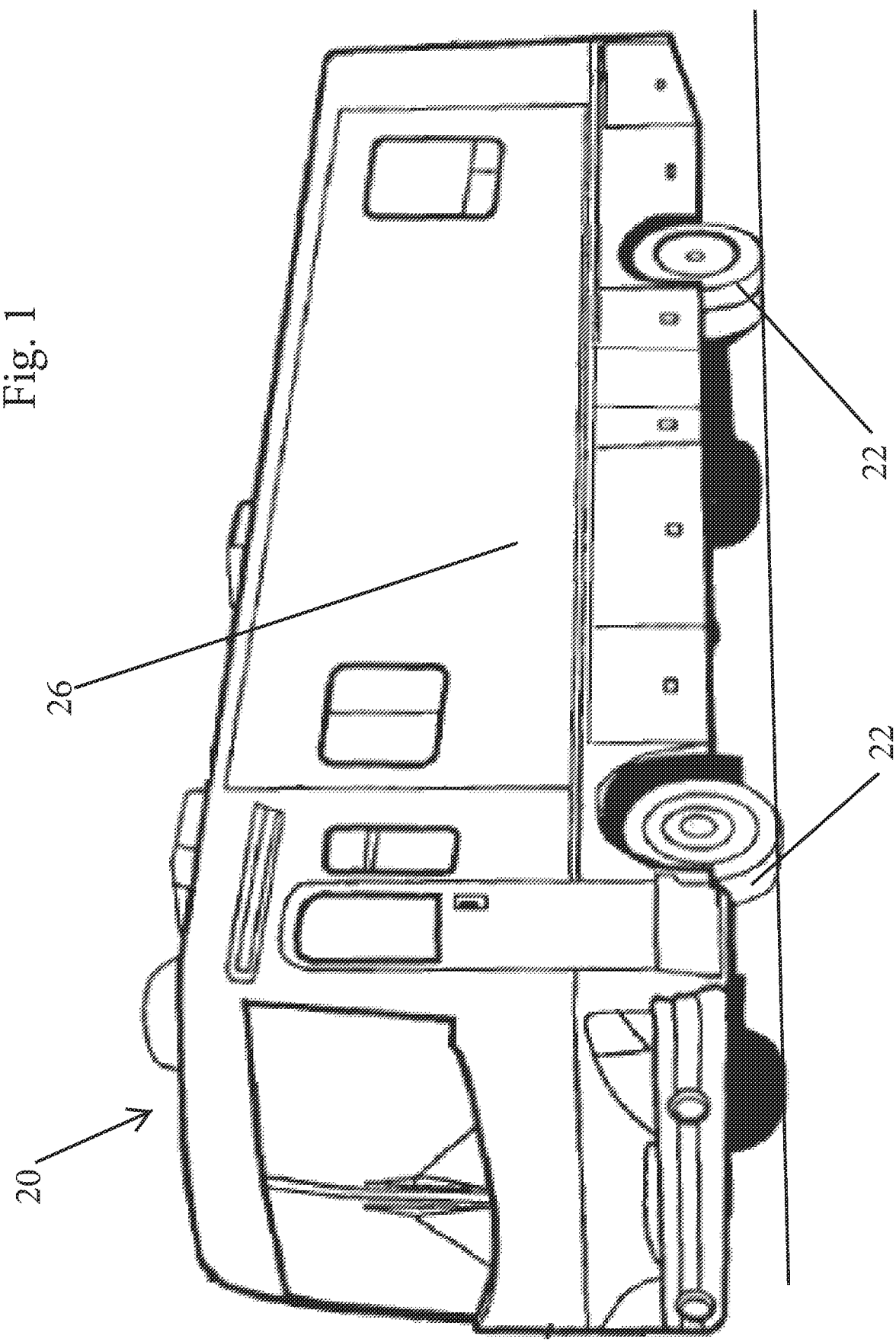
FIG. 1 is a view of a recreational vehicle.

FIG. 1 illustrates a recreational vehicle 20 comprising wheels 22 adapted to roll along a ground surface 24 and a chassis 26 supported on the wheels 22.

Figure 2:
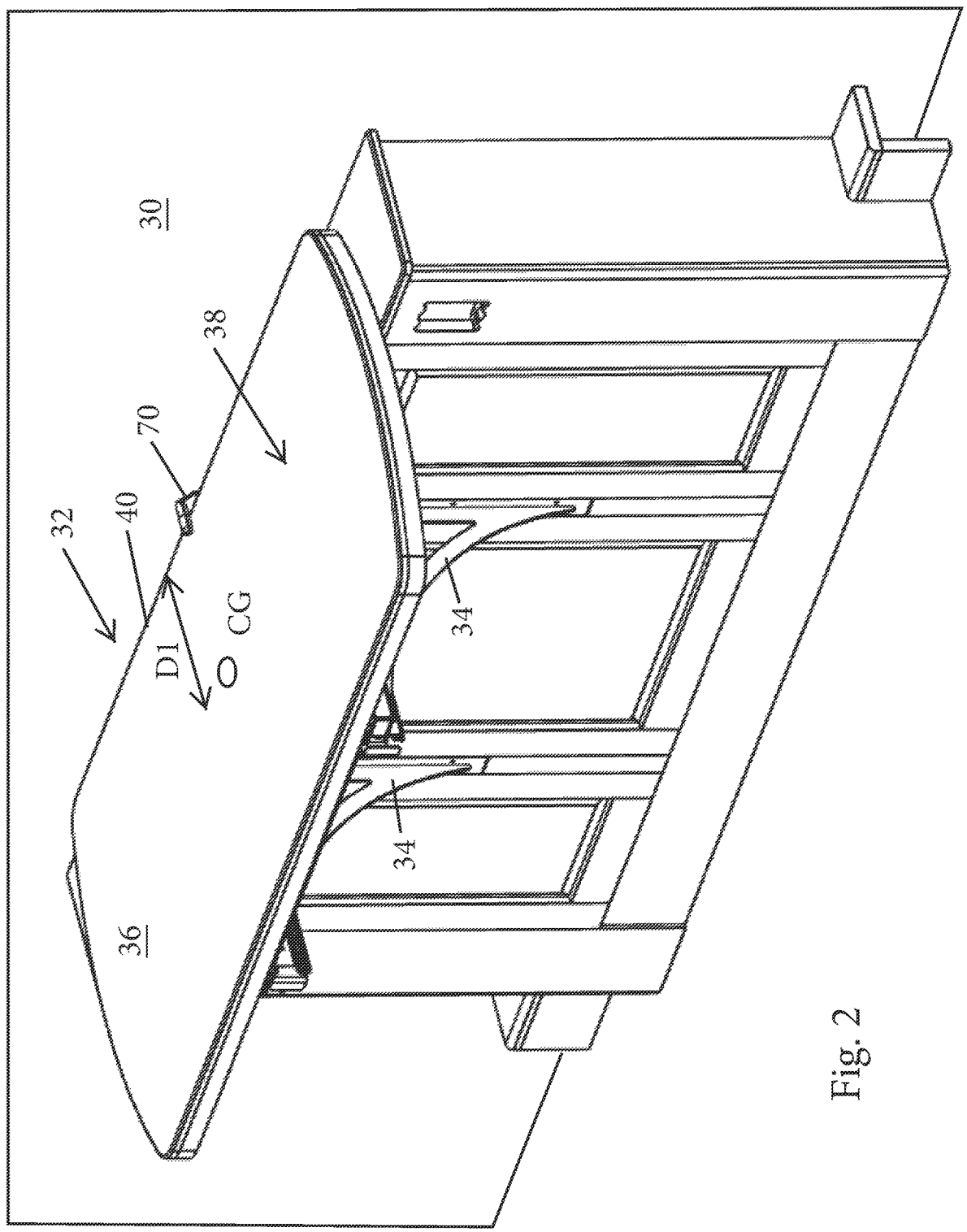
FIG. 2 is a perspective view of a table assembly in a stowed position.
Figure 3:
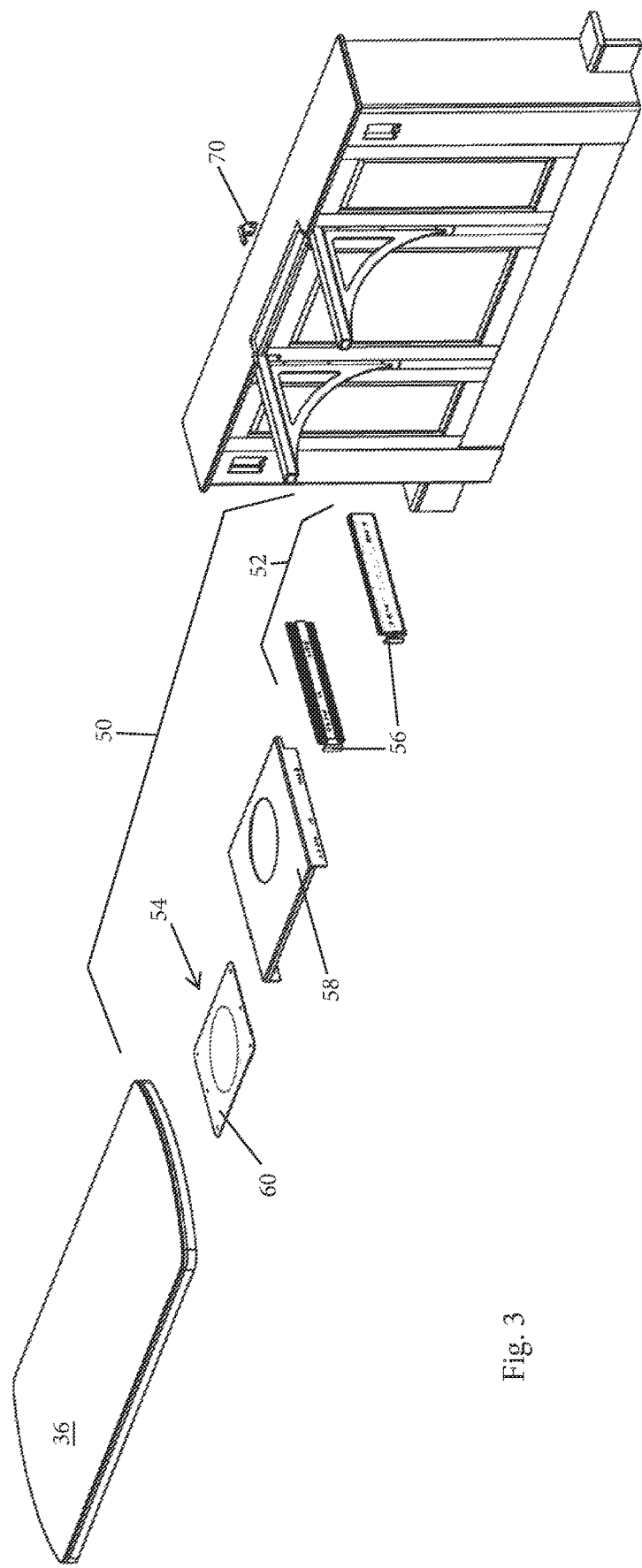
FIG. 3 is an exploded view of the table assembly of FIG. 2.

Referring to FIG. 2, the illustrated recreational vehicle 20 further includes a wall 30 supported by the chassis on the inside of the vehicle, a shelf 31, and a table assembly 32 supported by the shelf 31 and the wall 30. The wall 30 can be a fixed wall or movable wall that is sufficiently sturdy to support the table assembly 32.

The illustrated table assembly 32 includes two brackets 34 secured to the wall 30 and positioned to support a table member 36 having a supporting surface 38. The table member 36 can be moved from a stowed position (FIG. 2) to an extended position (FIG. 5) that is both rotated and translated from the stowed position. When in the stowed position, the position of the table member 36 is designed to meet walk-through clearance requirements, which is advantageous and/or required when the vehicle is moving. When in the extended position, the position of the table member 36 provides ample seating for at least four people when the vehicle is parked.

In the stowed position, a side edge 40 of the table member 36 is positioned adjacent the wall 30, a center of gravity CG of the table member 36 is positioned a first distance D1 from the wall 30, and the supporting surface 38 of the table member 36 defines a generally horizontal plane. In the extended position (FIG. 5), an end edge 42 of the table member 36 is positioned adjacent the wall 30, the center of gravity CG of the table member 36 is positioned at a second distance D2 (greater than the first distance D1) from the wall 30, and the supporting surface 38 defines a generally horizontal plane that is generally parallel to (e.g., co-planar with) the plane defined in the stowed position. As such, when the illustrated table member 36 is moved from the stowed position to the extended position, the center of gravity CG of the table member 36 is moved away from the wall 30, the upper surface 38 of the table member stays in the same plane, and the table member 36 is rotated (e.g., 90 degrees).

Figure 4:
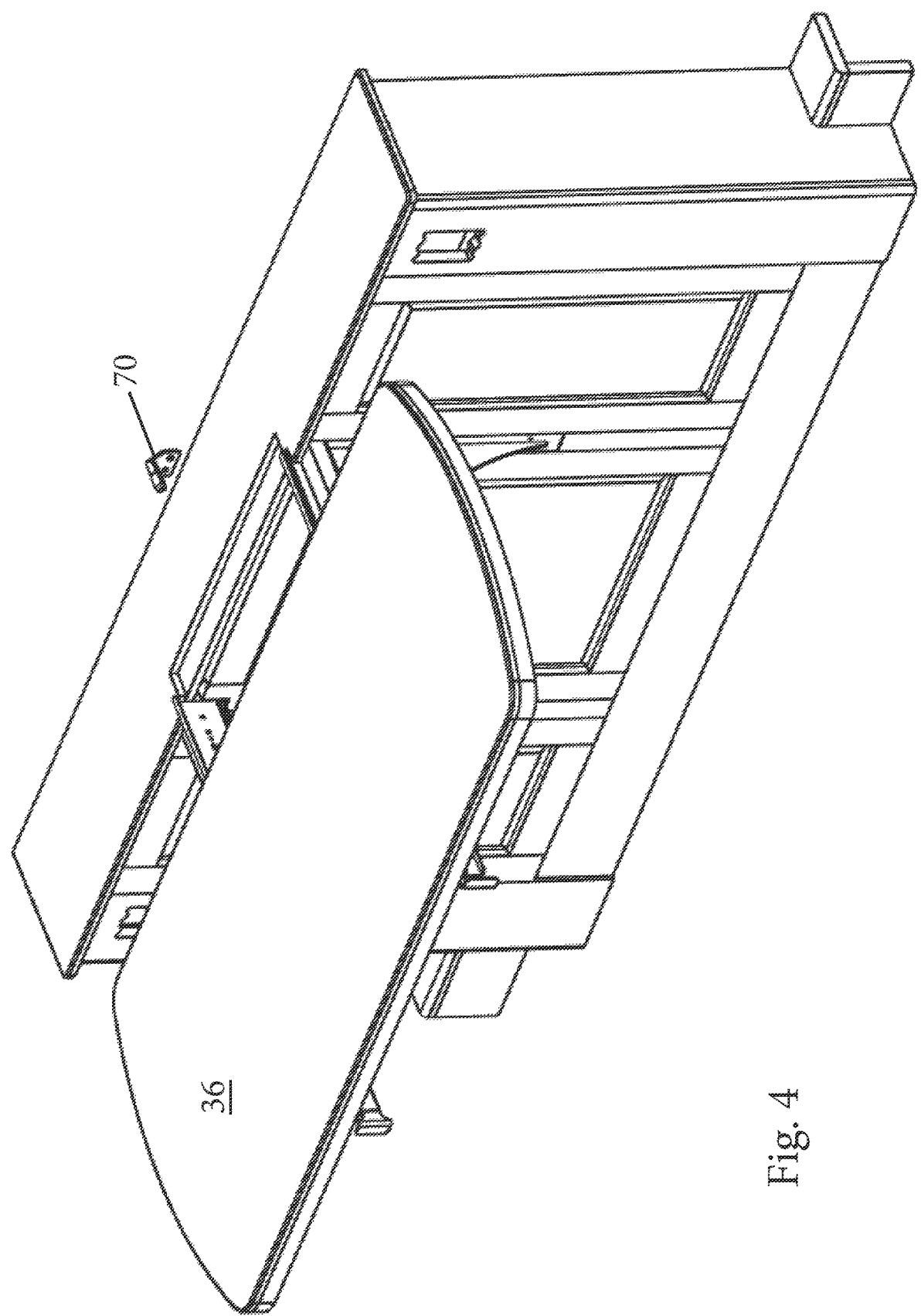
FIG. 4 is a perspective view of the table assembly of FIG. 1 in an intermediate position.
Figure 5:
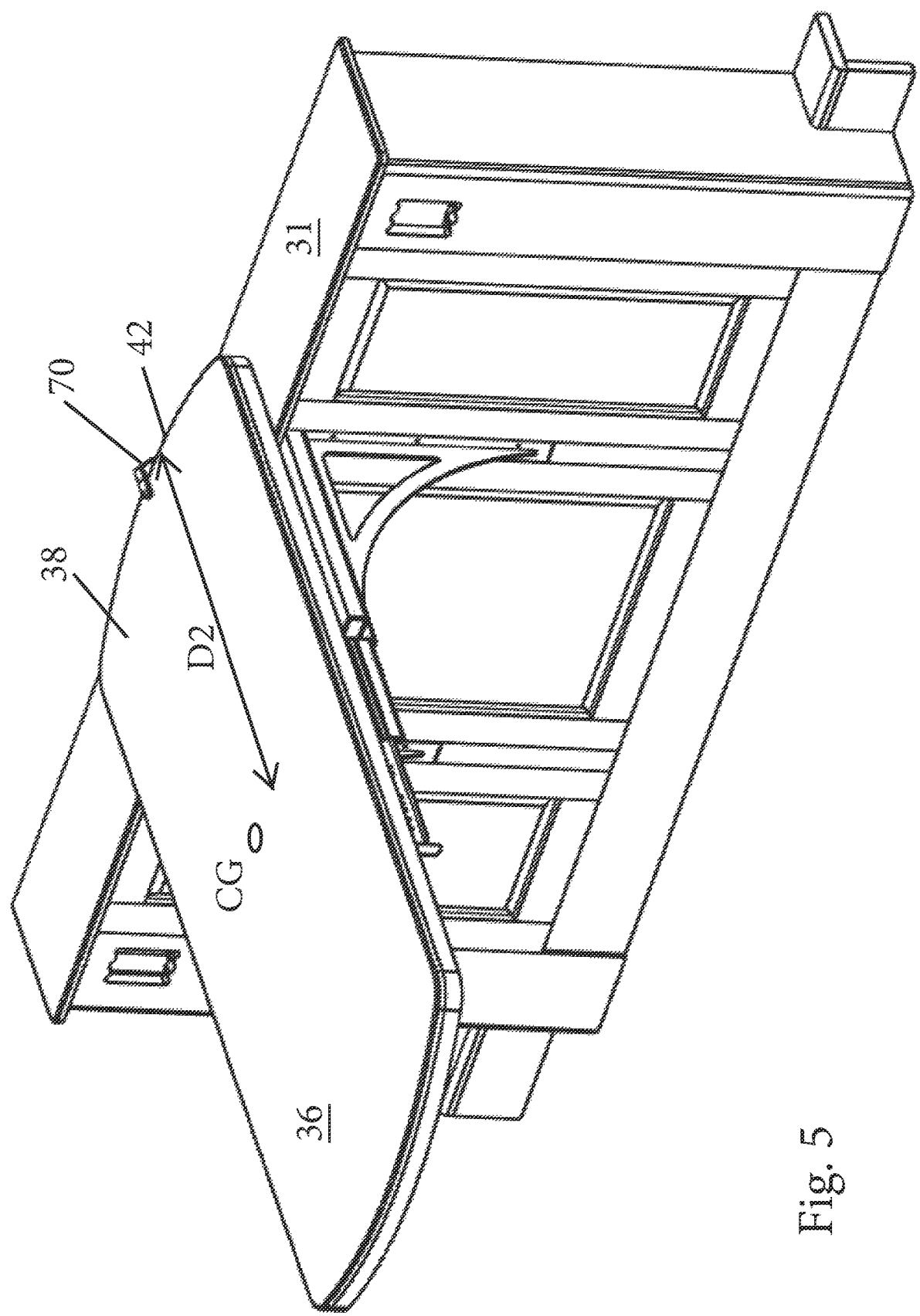
FIG. 5 is a perspective view of the table assembly of FIG. 1 in an extended position.

When moving the table member 36 from the stowed position (FIG. 2) to the extended position (FIG. 5), it is preferred that the table member 36 first be slid away from the wall 30 (FIG. 4) and then be rotated to the extended position (FIG. 5).

To facilitate movement of the table member 36 between the stowed and extended positions, the illustrated table assembly 32 further includes a transfer mechanism 50 coupling the table member 36 to the wall 30. The illustrated transfer mechanism 50 includes a telescoping slide mechanism 52 and a rotation mechanism 54 supported by the telescoping slide mechanism 52. In the illustrated embodiment, the telescoping slide mechanism 52 includes two telescoping slides 56 (e.g., 16" drawer slides with push/pull, in/out, latch release finger tabs on front edge of drawer slides and a 500 lb rating per side), each having one end secured to one of the brackets 34 and the other end secured to a bottom surface of a slide table 58 to facilitate translating the slide table 58 away from the wall. The illustrated rotation mechanism 54 includes a pivot table 60 (e.g., a turntable with 360 degree rotational capability and pressure spring detents every 90 degrees) supported by the slide table 58 and secured to the table member 36 to facilitate rotation of the table member 36 relative to the slide table 58. The size and capacity of the slide mechanism and turntable will depend on the size and weight of the table member 36. Suitable slide mechanisms and turntables can be sourced from McMaster-Carr Supply Company of Elmhurst, Ill.

Figure 6:
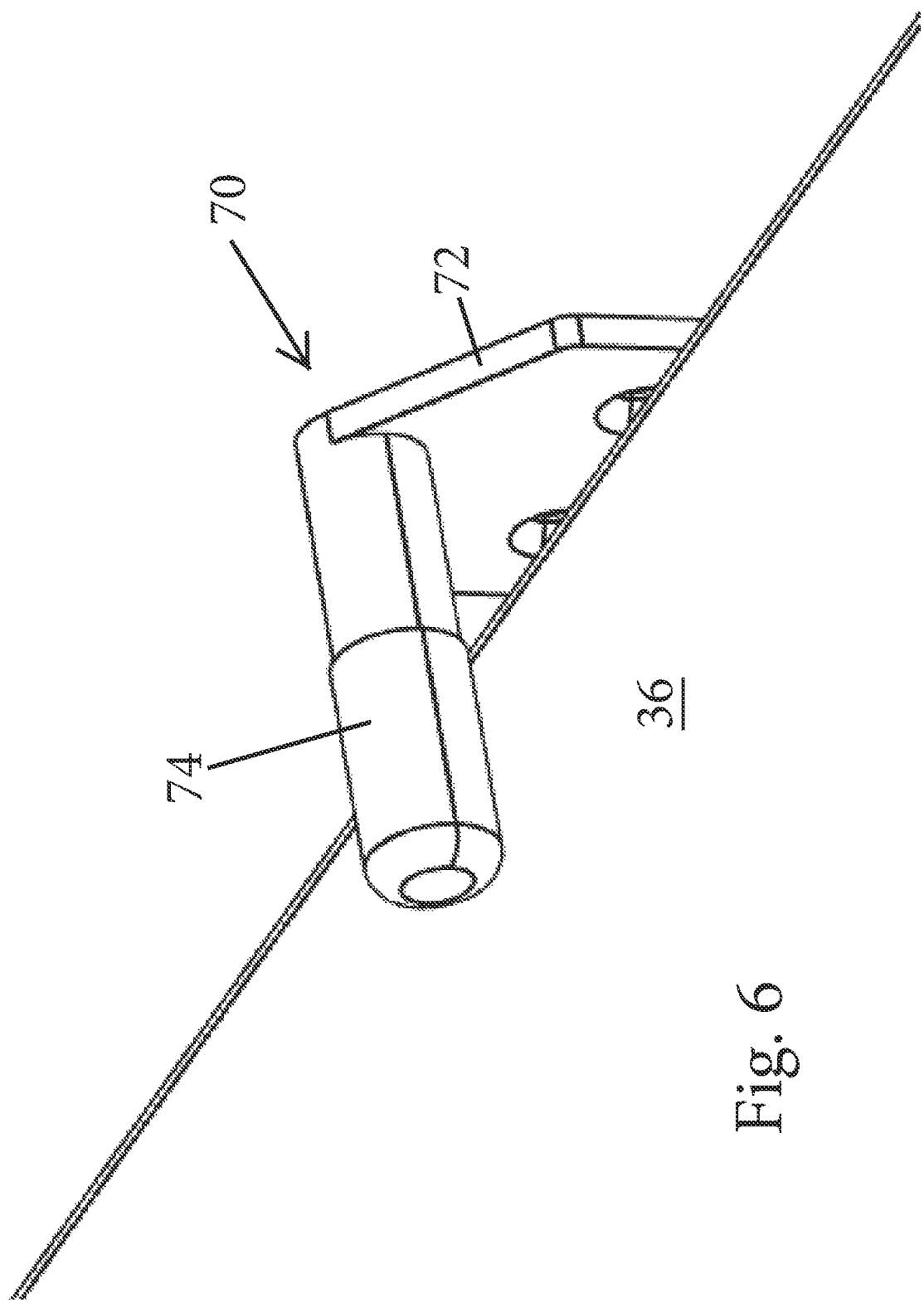
FIG. 6 is an enlarged perspective view of an upper support.

Referring to FIG. 6, an upper stay member 70 is secured to the wall 30 to limit upward movement of an edge of the table member 36. More specifically, the upper stay member 70 includes a base 72 secured to the wall 30 and a cap member 74 positioned above an edge of the table member 36. Preferably, the portion of the cap member 74 that contacts the upper surface of the table member 36 is an anti-scratch material, such as a polyethylene plastic. The cap member 74 may also be rotatable relative to the base 72 to further inhibit scratching of the table member 36. The upper stay member 70 limits upward movement of the table member 36 (e.g., if the opposite edge of the table member 36 receives a downward force) and also helps to guide the table member 36 when being moved between the stowed and extended positions.

Various features of the disclosure are set forth in the following claims.

The invention claimed is:

1. A recreational vehicle comprising:
   wheels adapted to roll along a ground surface;
   a chassis supported on the wheels; and
   a table assembly supported by the chassis and having a supporting surface adapted to support an object, wherein the table assembly includes a stowed position in which the supporting surface defines a first plane, an intermediate position in which the support surface is in the first plane, and an extended position in which the supporting surface defines a second plane substantially parallel to the first plane, wherein the intermediate position is translationally displaced from the stowed position and the extended position is rotationally displaced from the stowed position and the intermediate position,
   wherein the first plane is co-planer with the second plane.

2. A recreational vehicle as defined in claim 1, wherein the first and second planes are substantially horizontal.

3. A recreational vehicle as defined in claim 1, further comprising a wall supporting the table assembly, wherein the table assembly includes a table member having a first edge positioned adjacent the wall when in the stowed position.

4. A recreational vehicle as defined in claim 3, wherein the table member has a second edge positioned adjacent the wall when in the extended position.

5. A recreational vehicle as defined in claim 1, further comprising an upper stay member positioned above the table member to limit upward movement of the table member.

6. A recreational vehicle as defined in claim 5, wherein the stay member includes an anti-scratch cap member positioned to contact the table member.

7. A recreational vehicle as defined in claim 6, wherein the stay member further includes a base supporting the cap member, wherein the cap member is rotatable relative to the base.

8. A recreational vehicle as defined in claim 1, further comprising a wall supporting the table assembly, wherein the supporting surface is provided by a table member having a center of gravity that is spaced from the wall by a first horizontal distance when in the stowed position and is spaced from the wall by a second horizontal distance greater than the first horizontal distance when in the extended position.

9. A recreational vehicle as defined in claim 1, wherein the table assembly further includes a transfer mechanism coupled to the table member to facilitate movement of the table member between the stowed position and the extended position, wherein the transfer mechanism includes a telescoping slide mechanism and a rotation mechanism.

10. A recreational vehicle as defined in claim 9, wherein the rotation mechanism is supported by the telescoping slide mechanism.

11. A method of moving a table assembly on a recreational vehicle from a stowed position to an extended position, the recreational vehicle including wheels adapted to roll along a ground surface and a chassis supported on the wheels, the table assembly supported by the chassis and defining a supporting surface adapted to support an object, the method comprising:
    translating the table assembly from the stowed position in which the supporting surface defines a first plane to an intermediate position in which the supporting surface is in the first plane; and
    rotating the table assembly to the extended position with the supporting surface in a second plane substantially parallel to the first plane,
    wherein the first plane is co-planer with the second plane.

12. A method as defined in claim 11, wherein the first and second planes are substantially horizontal.

13. A method as defined in claim 11, wherein the recreational vehicle further includes a wall supporting the table assembly, wherein the table assembly includes a table member having a first edge, and wherein translating the table assembly includes moving the table assembly from the stowed position in which the first edge is positioned adjacent the wall to the intermediate position in which the first edge is spaced from the wall.

14. A method as defined in claim 13, wherein the table member has a second edge spaced from the first edge, and wherein rotating the table assembly includes moving the table assembly from the intermediate position in which the second edge is spaced from the wall to the extended position in which the second edge is positioned adjacent the wall.

15. A method as defined in claim 14, wherein the recreational vehicle further includes an upper stay member coupled to the wall, and wherein moving the table assembly to the extended position includes positioning at least a portion of the second edge at least partially under the upper stay member to limit upward movement of the table member.

16. A method as defined in claim 11, wherein the recreational vehicle further includes a wall supporting the table assembly, wherein the table assembly includes a table member having a center of gravity, and wherein translating and rotating comprising moving the center of gravity from a first horizontal distance from the wall when in the stowed position to a second horizontal distance from the wall greater than the first horizontal distance when in the extended position.

17. A recreational vehicle comprising:
    wheels adapted to roll along a ground surface;
    a chassis supported on the wheels;
    a wall supported by the chassis;
    a shelf supported by the wall;
    a table assembly supported by the shelf and including
       a first bracket supported by the shelf,
       a second bracket support by the shelf,
       a table member supported by the first bracket and the second bracket, the table member including
          a first side edge, a second side edge extending from the first side edge, a supporting surface at least partially defined by the first side edge and the second side edge and adapted to support an object, a stowed position in which the first side edge is positioned adjacent the wall, an intermediate position in which the first side edge is spaced apart from the wall, and an extended position in which the second side edge is positioned adjacent the wall, wherein the intermediate position is translationally displaced from the stowed position and the extended position is rotationally displaced from the stowed position and the intermediate position, a telescoping slide mechanism for moving the table member between the stowed position and the intermediate position, the telescoping slide mechanism including a first telescoping slide movably coupled between the first bracket and the slide table, and a second telescoping slide movably coupled between the second bracket and the slide table, and a slide table translatable relative to the first bracket and the second bracket via the first telescoping slide and the second telescoping slide, and a turntable rotatably supported by the slide table and coupled to the table member, the turntable rotatable relative to the slide table to move the table member between the intermediate position and the extended position.

18. A recreational vehicle as defined in claim 17, wherein the table member has a center of gravity that is spaced from the wall by a first horizontal distance when in the stowed position and is spaced from the wall by a second horizontal distance greater than the first horizontal distance when in the extended position.

19. A recreational vehicle comprising:

wheels adapted to roll along a ground surface;

a chassis supported on the wheels;

a table assembly supported by the chassis and having a supporting surface adapted to support an object, wherein the table assembly includes a stowed position in which the supporting surface defines a first plane, an intermediate position in which the support surface is in the first plane, and an extended position in which the supporting surface defines a second plane substantially parallel to the first plane, wherein the intermediate position is translationally displaced from the stowed position and the extended position is rotationally displaced from the stowed position and the intermediate position, and a wall supporting the table assembly, wherein the table assembly includes a table member having a first edge positioned adjacent the wall when in the stowed position.

20. A recreational vehicle as defined in claim 19, wherein the table member has a second edge positioned adjacent the wall when in the extended position.

21. A recreational vehicle comprising:

wheels adapted to roll along a ground surface;

a chassis supported on the wheels;

a table assembly supported by the chassis and having a supporting surface adapted to support an object, wherein the table assembly includes a stowed position in which the supporting surface defines a first plane, an intermediate position in which the support surface is in the first plane, and an extended position in which the supporting surface defines a second plane substantially parallel to the first plane, wherein the intermediate position is translationally displaced from the stowed position and the extended position is rotationally displaced from the stowed position and the intermediate position, and a wall supporting the table assembly, wherein the supporting surface is provided by a table member having a center of gravity that is spaced from the wall by a first horizontal distance when in the stowed position and is spaced from the wall by a second horizontal distance greater than the first horizontal distance when in the extended position.

* * * * *